Mar. 27, 1923.
G. S. R. KAMPMANN
1,450,088
TUMBLER OR WARD LOCK
Filed Sept. 14, 1921
3 sheets-sheet 1
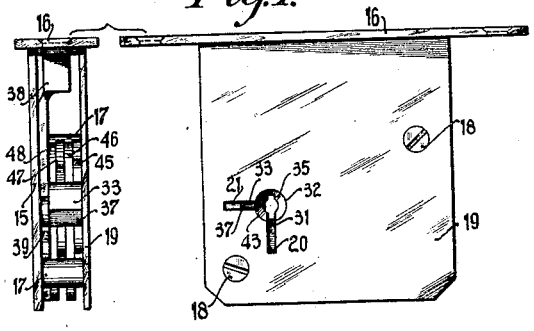
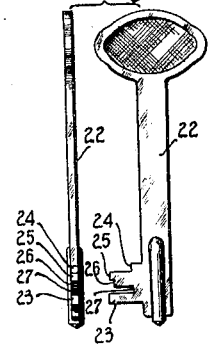
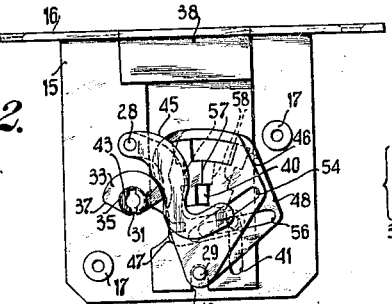
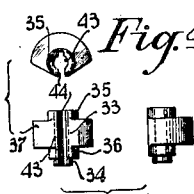
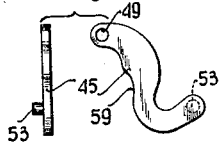
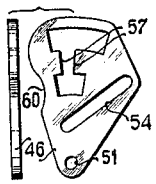
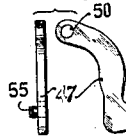
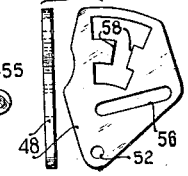
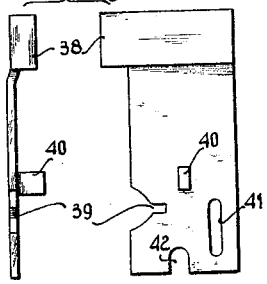
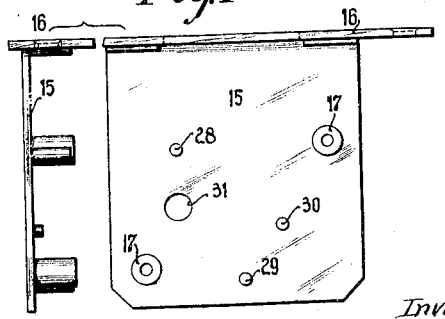
Inventor
G. S. R. Kampmann
by
Att'y Mar. 27, 1923.

G. S. R. KAMPMANN 1,450,088

TUMBLER OR WARD LOCK

Filed Sept. 14, 1921   3 sheets-sheet 3

Inventor
G. S. R. Kampmann
by
Att'y

Patented Mar. 27, 1923.

1,450,088

UNITED STATES PATENT OFFICE.

GERHARDT SIGVERT REHLING KAMPMANN, OF HOLTE, NEAR COPENHAGEN, DENMARK.

TUMBLER OR WARD LOCK.

Application filed September 14, 1921. Serial No. 500,664.

*To all whom it may concern:*

Be it known that I, GERHARDT SIGVERT REHLING KAMPMANN, a subject of the King of Denmark, residing at Holte, near Copenhagen, Denmark, have invented certain new and useful Improvements in Tumbler or Ward Locks, of which the following is a specification.

My present invention relates to so-called tumbler-locks or ward-locks and has for its object to provide a springless lock which is simple and cheap to manufacture and offers a remarkable safety against being opened by means of a skeleton-key.

As the gist of my invention can best be explained in the light of a full description of some practical embodiments I shall now proceed to describe one lock shown by way of example on the annexed drawings in which:

Fig. 1 illustrates two different views of the complete lock,

Fig. 2 is a view of the lock after removal of the cover plate, showing the mechanism in the position wherein the bolt is retracted, Fig. 3 shows a key fitting the lock, in two different views, Figs. 4–9 represent the separate parts of the mechanism, each in two different views, Fig. 10 illustrates two different views of the casing, Fig. 11 shows the position of the front tumbler with matching set lever assuming the key to have turned through about 90° in the direction for shooting the bolt, the lock being used as a drawer-lock.

Figure 18:

Fig. 18 the one locking member of a pair.

Figure 19:
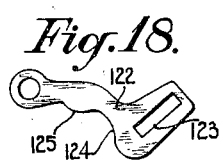

Fig. 19 the matching locking member.

Figure 20:

Fig. 20 the fitting key.

The casing 15 (Figs. 10–13), secured to which is the facing plate 16, is provided with columns 17 receiving the screws 18 for fastening the cover plate 19. Said cover plate 19 is provided with key-holes 20 and 21 to be used when the lock serves as a drawer-lock, and as a door-lock respectively. The casing further carries long pins 28 and 29 and a short pin 30, and is provided with a hole 31 opposite a corresponding hole 32 in the cover plate 19.

The key (Fig. 3) is of flat formation; its bit has a tooth 23 which as in ordinary locks serves for shooting the bolt and teeth 24, 25, 26, 27 for actuating the tumblers or wards.

Hole 31 forms the bearing for a journal 34 of a barrel 33 (Fig. 4) having a second journal 35 supported in hole 32. Near its front end the barrel 33 has a cylindrical portion 36, and intermediate between its journals is a set cam 37 having a cylindrical face and adapted when turned to move over the bolt and to act upon the tumblers or upon the matching set levers after the same have been set by the key. A central hole 43 and a slot 44 serve for guiding the key.

The bolt 38 is of ordinary formation and has a recess 39 cooperating with the key-bit 23 when the bolt is being shot or retracted, a rectangular arresting pin or fence 40 with which the tumblers are adapted to co-act, a guide way in the form of an elongated slot 41 into which projects the short pin 30, and a recess 42 for clearing the pin 29.

Mounted between cover plate 19 and bolt 38 are the four locking members 45, 46, 47 and 48 shown in Figs. 5–8, it being understood that as illustrated in Fig. 2 set lever 45 is in front, next is tumbler or ward 46, next is a second set lever 47 and facing the bolt is a tumbler 48.

Part of the curved left hand working faces of said locking members (see the right hand side views in Figs. 5–8) co-operate with the teeth 24—27 respectively of the key. The locking members should be differently formed in various locks, responsive to the differently formed key-bits. Should in the described locks the pairs of members 45, 46 and 47, 48 be interchanged, the lock would require another key in which the teeth 24, 25 are replaced by teeth 26, 27 and vice versa.

The set levers 45, 47 have holes 49, 50 passed through which is pin 28 on which they are rotatably mounted. The tumblers 46, 48 are pivoted on pin 29 and to this effect they are each provided with a hole 51 and 52 respectively. The set levers 45, 47 each carry a lateral stud pin 53, 55 projecting into slot 54 of tumbler 46 and slot 56 of tumbler 48 respectively.

Tumbler 46 has a recess of known form, comprising a narrow slot between tongues 57 for the passage of arresting pin 40 on bolt 38 when the latter is being shot or retracted after which the one or the other of said tongues 57 locks the bolt. The tongues 58 of tumbler 48 act in a similar manner.

As set lever 47 and tumbler 48 cooperate in quite the same manner as set lever 45 and tumbler 46, it is only necessary to explain in detail the functioning of members 45, 46.

Owing to the relative positions of pivots 28 and 29 (Fig. 10), of pin 53 and slot 54, if set lever 45 is turned through a certain angular distance, its pin 53 will move tumbler 46 positively into a predetermined position, and vice versa.

Referring now to Fig. 2, it is obvious that when the key is turned for shooting the bolt 8 the long tooth 25 deflects tumbler 46 before short tooth 24 engages set lever 45. Consequently, tooth 24 and set lever 45 move towards one another owing to the action of the walls of slot 54 on pin 53, until said tumbler and set lever assume the relative position shown in Fig. 11 when the key moves with its teeth along cylindrical cam faces 59 and 60 of set lever 45 and tumbler 46 respectively. During this initial motion of the members referred to set lever 45 has played an inactive part, unless tumbler 46 should have had a tendency to overdeflect by too abrupt a motion of the key, in which case the set lever would have been firmly pressed against tooth 24 so as to arrest the tumbler by the coaction of its pin 53 with slot 54.

Figure 11:
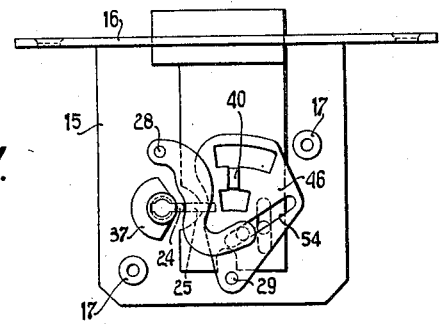
Figure 12:
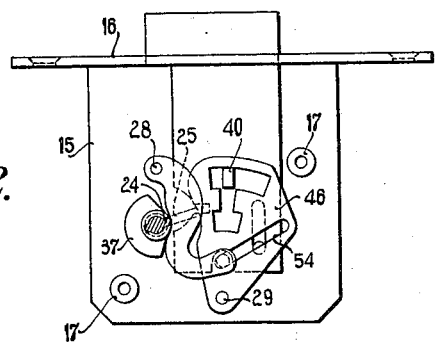
Fig. 12 represents another position of the parts shown in Fig. 11, assuming the key to have moved still further.
Figure 13:
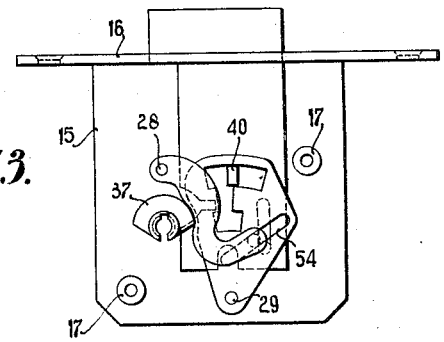
Fig. 13 shows the members illustrated in Fig. 11 in their positions after the bolt has been shot and locked.

It will be readily understood that prior to the key assuming its position as per Fig. 11 tumbler 46 has moved into position to allow arresting pin 40 of the bolt 38 to pass between its tongues 57. As soon as said arresting pin 40 has moved into its extreme outward position (see Fig. 12) set lever 45 becomes active. The set cam 37 of barrel 33 (Fig. 4) abuts against set lever 45 whereas the teeth of the key-bit move away both from the set lever and from the tumbler. The set cam 37 forces the set lever aside and owing to the coaction of pin 53 and slot 54 the tumbler 46 is turned back so as to form an impediment for the bolt 38. As long as the cylindrical face of cam 37 moves along the set lever and tumbler (Fig. 13) the last mentioned two members remain stationary. Moreover, said members cannot move involuntarily for if the tumbler should tend to move away from barrel 33 the set lever would of course tend to move in the opposite sense which is prevented by the barrel 37.

It follows that barrel 33 acts to lock the locking members when the bolt has been shot or retracted, and that it serves to return said members into their normal positions so as to perform the function of the springs in known constructions.

Seeing that the locking members 45, 46 are moved back into their normal locking positions by barrel 33, their working faces, for instance, the circular recesses or indents 59, 60 when touched or tested do not give any indication as to the lengths of the teeth of a fitting key. It is therefore impracticable to make a fitting key by testing the said working faces.

It is not strictly necessary for the set cam 37 to have a cylindrical face, as only its two end faces are operative. The intermediate portion could therefore be cut away, and it should be noticed that the provision of two separate cam portions instead of one integral cam has the advantageous feature that the barrel can be more easily balanced for the action of gravity. In the construction illustrated the set cam 37 will have to meet the condition that the radius of its cylindrical face should lie between the lengths of the teeth in one pair, measured from the axis of rotation of the key.

When considering the cooperation of locking members 47, 48 and teeth 26, 27 it will be seen that the key is adapted to positively move set lever 47 and that tumbler 48 follows this movement by the action of pin 55. Again, set cam 37 is adapted to positively move tumbler 48 into its normal position, and set lever 47 simply follows this movement, i. e. the active and passive effects here are just opposite those of members 45 and 46.

The locking members may be secured against being involuntarily moved out of their locking positions under the pressure of the bolt 38 owing, for instance, to vibrations, by making the bearing faces of tongues 57, 58 (which, in the example illustrated, are portions of cylindrical surfaces having their axes in the axes of holes 51 and 52 respectively) so that the weight of bolt 38 tends to move the passage between tongues 57, 58 away from arresting pin 40. With the same object in view I may provide said bearing faces with small projections adjacent to the passage between tongues 57, 58 so as to positively prevent the tumblers from involuntary movement by gravity or pressure exerted by bolt 38. In this case the key when turned for shooting the bolt will obviously have to move bolt 38 a little beyond the position wherein its arresting pin should engage said bearing surface and, when turned for retracting the bolt the key will first have to move the bolt outward so far that said projection can move past arresting pin 40.

The lateral pins 53 and 55 of set levers 45, 47 may be replaced by tongues stamped out of the metal sheet used for the manufacture of the levers, and bent upwards at right angles to the blank. Further, it is not necessary for the slots 54, 56 to be straight as shown, and in certain cases I may obtain better cooperation between set levers and tumblers by making said slots curved. Also, said slots could be cut in the levers 45, 47 when the lateral pins 53, 55 would have to be provided on the tumblers 46, 48, and further the coaction between lever and tumbler could be realized by a suitable lever system.

In order to prevent the tumblers and the barrel 33 from involuntary displacement from vibrations, I may cause the cover plate 19 to yieldingly press upon one or a plurality of said elements, or I may provide for springs exerting the required pressure.

The set levers 45, 47 in the example illustrated are so formed as to always clear the arresting pin 40 of bolt 38. It is, however, obvious, that said levers could also be formed to act as tumblers or wards cooperating with arresting pin 40 or with a second arresting pin secured to or integral with bolt 38. Such a construction would afford increased safety against forcing the lock.

The lock described in detail with reference to Figures 1–13 may still be simplified in such a manner that the barrel 33 may be dispensed with. For this purpose I provide the one of a pair of locking members (set lever and tumbler) with two or three contact faces adapted for cooperation with the corresponding tooth of the key-bit, one of these contact faces serving for moving said member into position for unlocking the bolt and the other contact face or faces having for their duty to move said member into position for locking the bolt. The matching member should in this case be mounted and cooperate with the first mentioned member in such a manner that another tooth of the key-bit effects the locking of the bolt, (namely when the first member has two contact faces), or the unlocking, namely when the first member is provided with three such faces. Consequently, the functioning of the one member supplements that of the mating member.

This modified construction is illustrated particularly in Figs. 14 to 20 inclusive, and the following description has particular reference to such figures.

The casing 111, which is secured to the facing plate 110, is provided with fixed studs 112, 113, a pin 114 for guiding the key, and a pin 115 for guiding the bolt. The cover plate 116 is fastened by screws turned into the studs 112, 113.

The bolt 117 is provided with a recess 118 coacting with the extreme tooth 119 of the key-bit for actuating the bolt, and it further has a recess 120 of known form and a slot 121 cooperating with pin 115.

One of the locking members is in the form of a lever 122 pivoted on stud 112 and provided with a slot 123, a cam face 124 and a projection 125, said face and said projection being adapted to be acted upon by the tooth 126 of the key-bit.

The matching locking member is in the form of a lever 127 pivoted on stud 113 and provided with a cam face 128, a projection 129 and with projections 130, 131 bent at right angles to the blank. The tooth 132 of the key-bit is adapted to act upon the cam face 128 and the projection 129. The projections 130, 131 extend into slot 123 of lever 122 and recess 120 of the bolt, respectively.

Obviously lever 127 could be mounted directly upon the bolt, and in this case the projection 130 would have to be bent upwardly instead of downwardly as illustrated.

Figure 16:
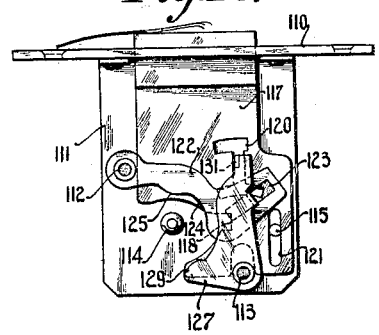
Fig. 16 is a view of the modified operating mechanism in another position.
Figure 17:
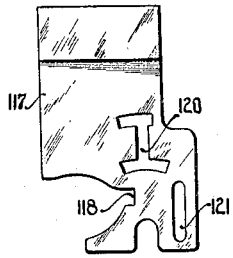
Fig. 17 shows the bolt.

Fig. 16 shows the position of the mechanism when the bolt is being shot or retracted. The cam face 128 of lever 127 has been forced away from pin 114 by tooth 132 of the key-bit and owing to the coaction between projection 130 and slot 123 lever 122 has moved towards the tooth 126 until cam face 124 engaged said tooth. The projection 131 of lever 127 had thus been positively moved into position just opposite the narrow passage in recess 120 of bolt 117 so that the latter could be moved by tooth 119 into the position shewn.

Figure 14:
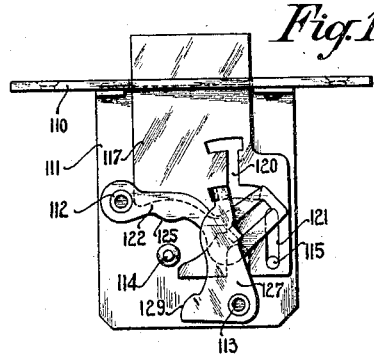
Fig. 14 is a view of a modified operating mechanism with the casing and the facing plate.
Figure 15:
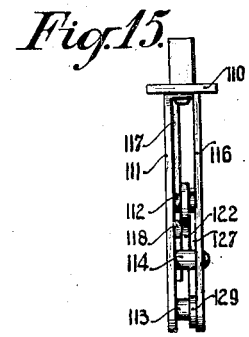
Fig. 15 is a side view of the lock.

If now the key is turned further the tooth 126 acts upon the projection 125 of lever 122 whereby owing to the cooperation between the walls of slot 123 and the projection 130 lever 127 deflects into a position wherein its projection 131 locks the bolt, see Fig. 14.

If, however, the bolt is retracted by the key from the position shown in Fig. 16 into its extreme inward position, the tooth 132 first abuts against projection 129 of the lever 127 and then moves past same whereby said lever locks the bolt.

As a matter of course the recess 120 could be provided in one of the levers 122, 127 which should then be correspondingly shaped, and in this case the bolt should have a projection extending into said recess. Further, the pair of locking members could be duplicated as in the lock illustrated in Figs. 1–13.

In the embodiment illustrated in Figs. 14–20 lever 122 has contact faces 124, 125 for the key, and lever 127 has contact faces 128, 129. Evidently, however, it is possible to shift contact face 125 to lever 127, or contact face 129 to lever 122. For instance, projection 125 could be cut away (in which case contact face 124 should be otherwise shaped) and lever 127 be provided opposite projection 130 with a projection so formed that when the key is turned for locking the lock and the bolt has reached its extreme outward position, the key would force lever 127 away whereby projection 131 would enter the right hand side end of recess 120 instead of the left hand side end as shewn in Fig. 14. For opening the lock the contact face 124 of lever 122 should in this case be so formed that the key is adapted to move said lever outwards whereby lever 127 owing to the coaction between slot 123 and projection 130 is moved towards the key and the bolt is unlocked.

It will be understood that lever 122 could also be provided with three contact faces in which case projection 129 of the lever 127 should be dispensed with. This would have the same effect as if lever 127 were provided with three contact faces in addition to a slot 123, and that the projection 130 were arranged on lever 122 having, in this case, only one contact face 124. This and other interchanges of the functions of parts obviously lie within the spirit and the scope of the invention.

What I claim and desire to secure by Letters Patent is:—

1. In a lock, a locking bolt, members including a tumbler and a set lever arranged in the lock, the tumbler cooperating with the bolt to positively lock the same in projected or retracted position, the set lever being connected with the tumbler to cause said set lever and tumbler to move in relatively opposite directions under the action of the key, and means whereby said members may be set through the actuation of one thereof to unlock the bolt.

2. A key operated lock including a locking bolt, and means intermediate the bolt and key to lock the bolt in projected or retracted position, said means including a set lever and a tumbler, one of which is movable by the key to lock or release the locking bolt, and the other of said parts being actuated by the key movable part to arrange it in a position to be subsequently operated by the key.

3. In a key operated lock, a locking bolt, a tumbler to lock the bolt against movement when in retracted or projected position, said tumbler being formed to be operated by the key to release the locking cooperation between the tumbler and bolt in the movement of the key to project the bolt, and a set lever to be subsequently operated by the key to move the tumbler into locking cooperation with the locking bolt, said set lever being positioned for operation in the initial unlocking movement of the tumbler.

4. In a key operated lock, a bolt, and locking means for the bolt adapted to be unlocked by the key when the bolt is to be projected or retracted, said means including separate members, each arranged for key operation, the particular member finally operated in the key movement setting the other member for initial key operation in a successive bolt actuation.

5. In a key operated lock, a bolt, and locking means for the bolt adapted to be actuated by the key when the bolt is to be projected or retracted, said means including a tumbler arranged to engage with the bolt for locking the same, and a set lever connected with the tumbler, said set lever and tumbler being both operated in any one key operation to initially unlock the bolt and finally lock the same.

6. In a key operated lock, a bolt, and locking means for the bolt adapted to be actuated by the key when the bolt is to be projected or retracted, a tumbler arranged to engage with the bolt for locking the same and having a key engaging projection thereon, and a set lever having a key engaging projection thereon and connected with the tumbler to operate the latter in the movement of the set lever, the initial engagement of the key with the projection of the tumbler on said lever serving to unlock the bolt.

7. In a key operated lock, a bolt, and locking means for the bolt adapted to be actuated by the key when the bolt is to be projected or retracted, a tumbler formed with a projection to engage with and lock the bolt, and a set lever having a projection to seat in a slot in the tumbler, said tumbler and set lever being each formed with projections to be engaged by the key, the projection of either of said members initially engaged by the key serving to actuate the other of said members to arrange its projection for final engagement by the key.

In testimony whereof I affix my signature.

GERHARDT SIGVERT REHLING KAMPMANN.